United States Patent [19]
Hicks et al.

[11] Patent Number: 5,654,507
[45] Date of Patent: Aug. 5, 1997

[54] PULSE WIDTH MODULATED CONSTANT TEMPERATURE ANEMOMETER

[75] Inventors: Theron J. Hicks, Jackson; John F. Foss, Okemos; Douglas G. Bohl, Lansing, all of Mich.

[73] Assignee: Board of Trustees operating Michigan State University, East Lansing, Mich.

[21] Appl. No.: 675,609

[22] Filed: Jul. 3, 1996

[51] Int. Cl.[6] .................................................. G01F 1/68
[52] U.S. Cl. ............................................................ 73/204.14
[58] Field of Search ........................... 73/204.14, 204.15, 73/204.16, 204.18, 861.356

[56] References Cited

U.S. PATENT DOCUMENTS

| | | | |
|---|---|---|---|
| 3,603,147 | 9/1971 | Dorman | 73/189 |
| 3,905,230 | 9/1975 | Calvet et al. | 73/204 |
| 4,043,195 | 8/1977 | Hunting | 73/204 |
| 4,043,196 | 8/1977 | Trageser | 73/204 |
| 4,059,982 | 11/1977 | Bowman | 73/15 A |
| 4,334,186 | 6/1982 | Sasayama et al. | 323/365 |
| 4,335,605 | 6/1982 | Boyd | 73/204 |
| 4,501,145 | 2/1985 | Boegli et al. | 73/204 |
| 4,565,091 | 1/1986 | Ito et al. | 73/118 |
| 4,596,140 | 6/1986 | Dorman et al. | 73/204 |
| 4,655,089 | 4/1987 | Kappelt et al. | 73/861.356 |
| 4,794,794 | 1/1989 | Djorup | 73/204 |
| 4,807,151 | 2/1989 | Citron | 364/510 |
| 4,852,027 | 7/1989 | Bowman et al. | 364/557 |
| 4,934,188 | 6/1990 | Tanimoto et al. | 73/204.14 |
| 4,934,189 | 6/1990 | Tanimoto et al. | 73/204.14 |
| 5,064,296 | 11/1991 | Huijsing et al. | 374/163 |
| 5,074,147 | 12/1991 | Sarma | 73/204.15 |
| 5,117,691 | 6/1992 | Fraser | 73/204.15 |
| 5,218,866 | 6/1993 | Phillips et al. | 73/204.15 |
| 5,493,906 | 2/1996 | Sem-Zhi | 73/204.15 |

*Primary Examiner*—Richard Chilcot
*Assistant Examiner*—Jewel Artis
*Attorney, Agent, or Firm*—Brinks Hofer Gilson & Lione

[57] ABSTRACT

A constant temperature anemometer utilizes a fine wire or thin film sensor or probe and a pulse width modulated driver in a digital control loop to adjustably drive the probe to maintain its temperature at a nominally constant value and provide a digital output to associated metering or recording equipment. The pulse width modulated driver includes a clock, an RS flip-flop and a comparator. At the beginning of the clock cycle, power is provided to a voltage divider and the divided voltage drives one input of the comparator and the fine wire or thin film sensor. The other input of the comparator is maintained at a reference voltage. When the drive voltage to the hot wire or thin film sensor exceeds the reference voltage, the comparator provides a high logic signal to the RS flip-flop, resetting it and shutting off power to the sensor until the next clock cycle. The pulse width modulated drive signal may be utilized directly by an associated processor or computer. Various circuit features may be added to improve operation given specific installation or operating parameters.

23 Claims, 6 Drawing Sheets

PULSE WIDTH MODULATED CONSTANT TEMPERATURE ANEMOMETER

BACKGROUND OF THE INVENTION

The invention relates generally to constant temperature, i.e., fine wire/thin film or hot-wire/hot-film, anemometers and more specifically to a constant temperature fine wire or film sensor driven by a pulse width modulated digital control loop.

The accepted manner of sensing fluid flow velocities, particularly velocities of air, comprehends the use a short, fine wire or thin film sensor disposed in the fluid flow. An electrical current is passed through the wire or film, heating it and, through such heating, varying the resistance of the wire or film. If the electrical energy provided to the wire or film is equal to the energy transferred by the wire or film by virtue of the fluid flow around it, equilibrium is achieved. During such equilibrium, the energy provided to the wire or film to maintain its temperature is a function of and may be utilized to infer the fluid velocity.

Presently available constant temperature anemometers utilize a Wheatstone bridge in conjunction with a high gain solid state feedback amplifier. See Comte-Bellot, G., 1976 "Hot-Wire Anemometry," *Annual Review of Fluid Mechanics,* pp. 209–231, Annual Reviews, Inc. Palo Alto, Calif., Blackwelder, R. F., 1981, *Hot-Wire and Hot Film Anemometers,* Academic Press, Inc., New York, N.Y. and Perry, A. E., 1982, *Hot-Wire Anemometry,* Clarendon Press Oxford University Press, New York, N.Y.

While the advent of high gain, solid state electronics in this field greatly improved the accuracy and expanded fine wire and thin film anemometry applications, operational problems and limits on applications still exist. For example, the signal to noise ratio, the frequency response and the oscillatory instability of such amplifiers as well as the use of the basic Wheatstone bridge circuit still place operational limits on fine-wire or thin film anemometers. The accuracy of measurements taken with such devices is affected by such considerations.

Significant patented technology in this measurement field exists. For example, U.S. Pat. No. 3,905,230 which utilizes a thermoresistive sensor in one leg of a Wheatstone bridge and a pulse generator which sequentially provides a first pulse and a second pulse, the second pulse being provided before the sensor has returned to thermal equilibrium. The flow rate is determined by measuring the resistance of the sensor during the pulses. U.S. Pat. No. 4,334,186 teaches a hot wire constant temperature air flow sensor which includes an ambient sensing and compensating element. A pulse train having pulse widths corresponding to differences between the voltage drops across the hot wire sensor and the temperature compensating element interrupts the current supply to the hot wire.

U.S. Pat. No. 4,565,091 again teaches a pair of sensing elements disposed in a Wheatstone bridge. One of the elements is heated in order to achieve air flow measurement and the other element constitutes an ambient temperature measuring means. The outputs of the two sensors are provided to the inputs of a comparator which drives the reset input of a flip-flop. The set input of the flip-flop is driven through an AND gate by either the signal from a burning off controller or an initializing pulse. U.S. Pat. No. 4,794,794 discloses a thermal anemometer including a constant temperature bridge excitation circuit, multiple signal comparators and a tapped resistance divider which provides a linearized digital output and a linear analog output.

U.S. Pat. No. 4,807,151 utilizes a mass air flow sensor and bridge circuit. The bridge circuit generates a first mass flow signal having rate and temperature related errors and resistances which provide respective signals for air temperature correction and mass flow rate correction.

U.S. Pat. No. 4,934,188 utilizes a modified Wheatstone bridge circuit having a heated sensing element for sensing flow rate and a second sensing element for sensing air temperature. The output of the Wheatstone bridge is provided to a comparator and a voltage to frequency converter. Improved responsiveness of the temperature sensing element is claimed. U.S. Pat. No. 5,074,147 discloses a flow rate measuring apparatus which maintains constant voltage or constant power to a hot wire or hot film sensor. An operational amplifier disposed in a negative feedback loop drives the sensor. Finally, U.S. Pat. No. 5,493,906 teaches another constant temperature anemometer which utilizes a Wheatstone bridge and which includes a pair of operational amplifiers, the second of which provides a correcting offset voltage which is claimed to improve the stability and frequency band width of the device.

From the foregoing, it is apparent that significant prior art exists but that improvements in the art of constant temperature hot wire anemometry are achievable.

SUMMARY OF THE INVENTION

A constant temperature anemometer utilizes a fine wire or thin film sensor and a pulse width modulated driver in a digital control loop to adjustably drive the sensor to maintain its temperature at a nominally constant value and provide a digital output to associated metering or recording equipment. The pulse width modulated driver includes a clock, an RS flip-flop and a comparator. At the beginning of the clock cycle, power is provided to a voltage divider and the divided voltage drives one input of the comparator and the fine wire or thin film sensor. The other input of the comparator is maintained at a reference voltage. When the drive voltage to the hot wire or thin film sensor exceeds the reference voltage, the comparator provides a high logic signal to the RS flip-flop, resetting it and shutting off power to the sensor until the next clock cycle. The pulse width modulated drive signal may be utilized directly by an associated processor or computer. Alternatively, counter circuitry may be included in the device to provide a 16 bit output to a personal computer or other storage or processing device.

Various circuit features may be added to improve operation given specific installation or operating parameters. For example, a typical and preferred laboratory installation places the fine wire or thin film sensor a certain distance from the drive circuitry to which the sensor is coupled by a length of coaxial cable. Due to typically encountered impedance mismatches, drive pulses are reflected along the coaxial cable and must be suppressed or ignored or they will interfere with normal operation. Reflected pulse suppression circuitry is therefore also disclosed. The invention is also useful with both positive and negative coefficient of resistance fine wire or thin film probes.

Thus it is an object of the present invention to provide a pulse width modulated constant temperature anemometer.

It is a further object of the present invention to provide a pulse width modulated constant temperature anemometer having a fine wire or thin film probe.

It is a still further object of the present invention to provide a pulse width modulated constant temperature anemometer displaying improved stability and greater frequency response than conventional constant temperature anemometers incorporating Wheatstone bridge circuits.

It is a still further object of the present invention to provide a pulse width modulated constant temperature anemometer displaying improved stability and greater frequency response than conventional constant temperature anemometers incorporating high gain analog amplifiers.

It is a still further object of the present invention to provide a pulse width modulated constant temperature anemometer having an improved transfer function which significantly improves the signal to noise ratio.

It is a still further object of the present invention to provide a pulse width modulated constant temperature anemometer that may be used with both positive and negative coefficient of resistance fine wire probes.

Further objects and advantages of the present invention will become apparent by reference to the following description of the preferred embodiment and appended drawings wherein like reference numbers refer to the same component, element or feature in the several drawing figures.

DESCRIPTION OF THE PREFERRED EMBODIMENT

Figure 1:
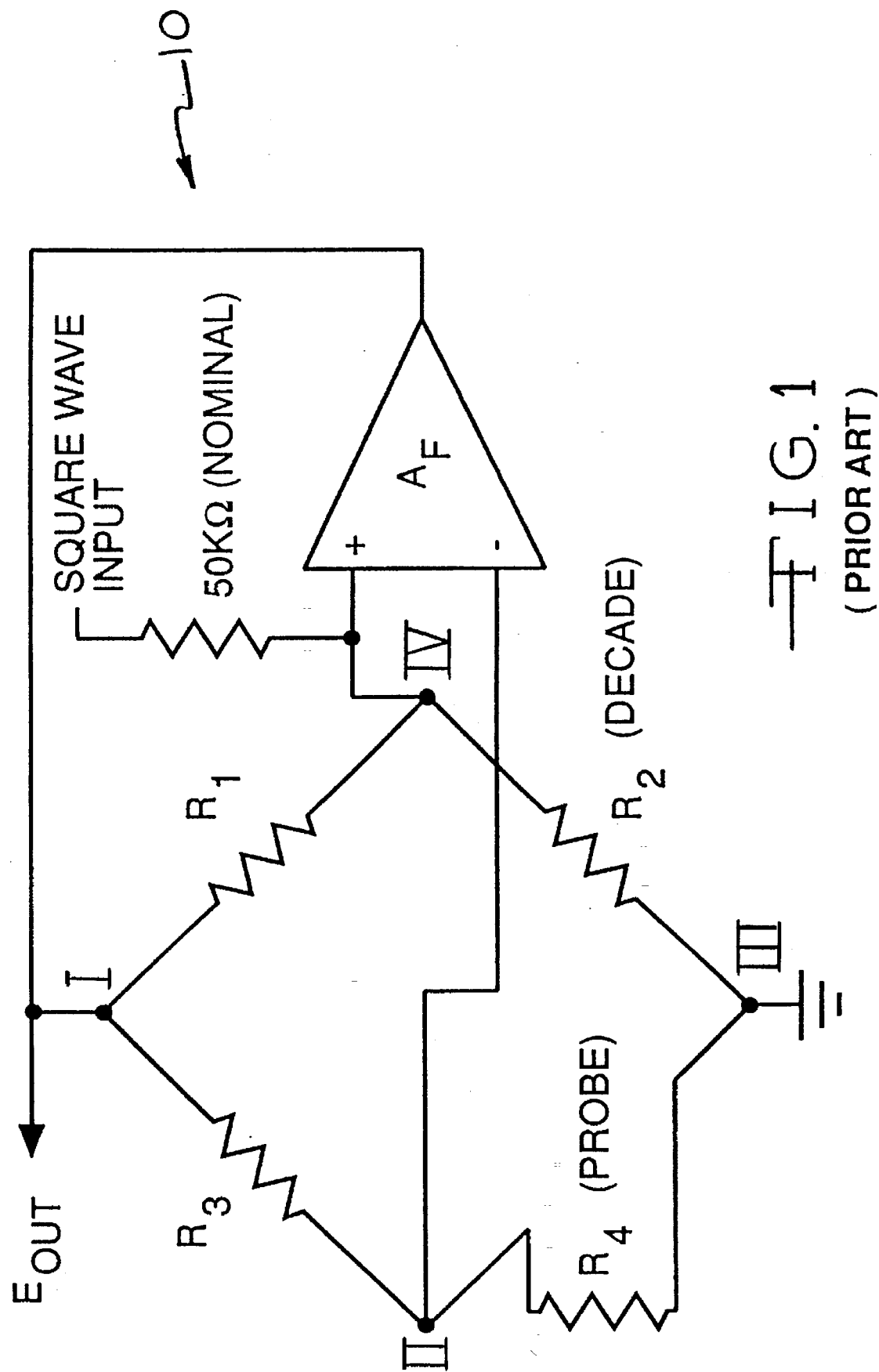
FIG. 1 is a schematic of the significant components of a typical prior art Wheatstone bridge type constant temperature anemometer.

Referring now to FIG. 1, a conventional constant temperature anemometer is illustrated and designated by the reference numeral 10. The constant temperature anemometer 10 includes a Wheatstone bridge having a pair of fixed resistors R1 and R3, an adjustable decade resistor R2 and a fine wire or thin film sensor R4. Terminals II and IV drive the inputs of an operational or feedback amplifier AF, the positive input of which may be excited by a square wave input through an isolating and dropping resistor having a nominal value of 50K ohms. The output of the operational amplifier AF is fed back to the bridge terminal I and also represents the output signal of the anemometer 10 which drives associated indicating or recording equipment (not illustrated). When the operational amplifier AF receives an imbalance signal $(E_{II}-E_{IV}) \neq 0$, it responds by providing additional or reduced current to the bridge and to the fine wire or thin film sensor R4. The momentary bridge voltage $(E_I-E_{III})$ is proportional to this additional or reduced current, assuming nominal constancy of the four resistances of the Wheatstone bridge and a conventional E–Q transfer function can be written for $E_I-E_{III}$ as $$E_2 = A(\gamma) + B(\gamma)Q^{n(\gamma)} \tag{Eq.1}$$

where A, B and n are constants at a given angle ($\gamma$) between the axis of the fine wire or thin film sensor R4 and Q is the fluid velocity magnitude at the sensor R4. If it is assumed that the fine wire or thin film sensor R4 is disposed perpendicularly to the direction of fluid flow, the angular dependence term ($\gamma$) may be omitted and the equation becomes $$E^2 = A + BQ^n \tag{Eq.2}$$

Typically, presently available constant temperature anemometer assemblies utilize solid state amplifiers and electronics. Nonetheless, three areas have been identified as either contributing to the inaccuracies of current devices or limiting their performance and applications: (a) signal to noise ratio, (b) frequency response and (c) oscillatory instability.

Figure 2:
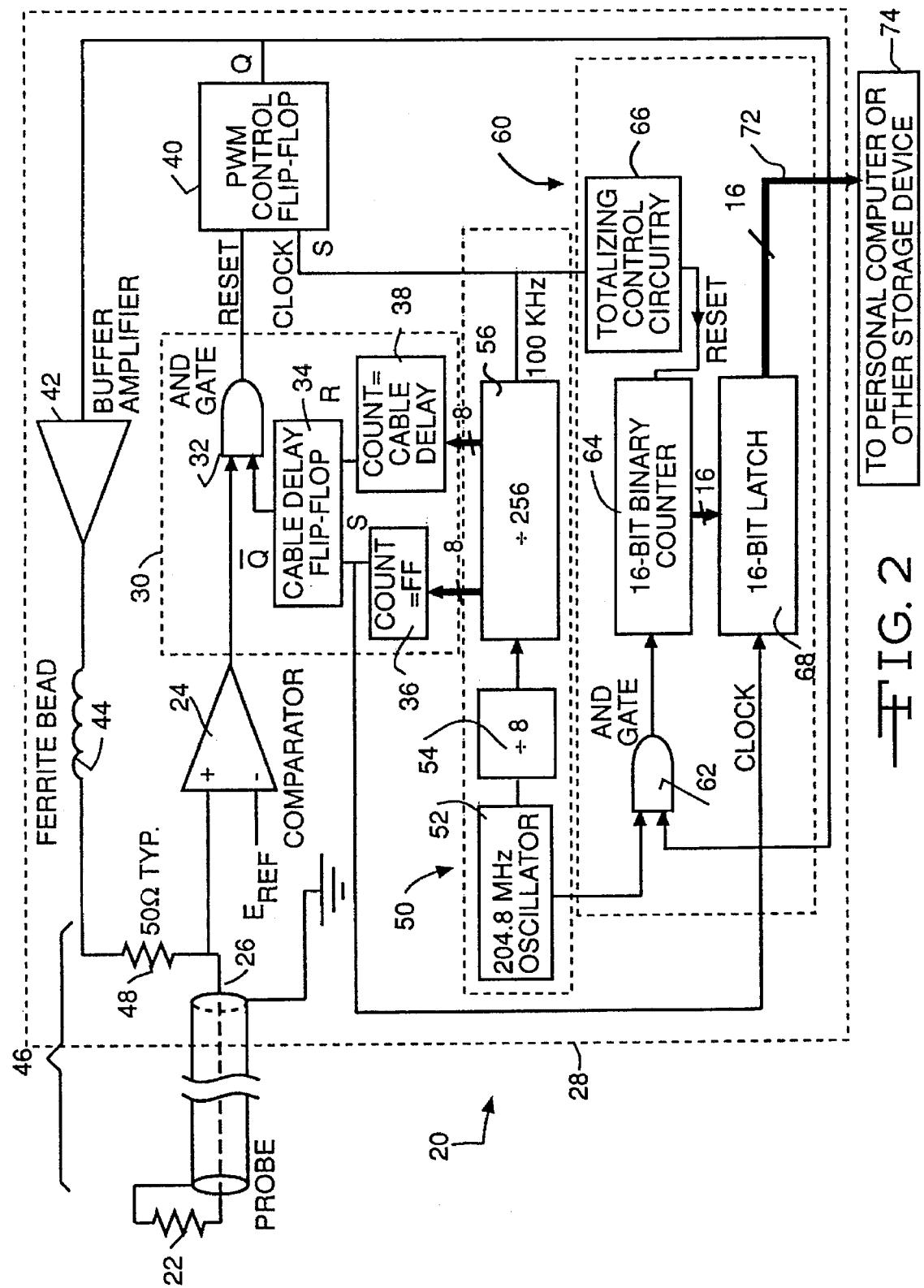
FIG. 2 is a schematic diagram of a preferred embodiment of a pulse width modulated constant temperature anemometer according to the present invention.

Referring now to FIG. 2, a schematic block diagram of a pulse width modulated constant temperature anemometer assembly according to the present invention is illustrated and designated by the reference numeral 20. The constant temperature anemometer assembly 20 includes a conventional hot or fine wire or film sensor or probe 22 which includes a temperature sensitive resistance element 22. The temperature sensitive resistance element 22 may have either a positive or negative coefficient of resistance. Moreover, the temperature sensitive resistance element 22 may be either a fine wire or thin film sensor. A fine wire sensor may be on the order of 5 microns or thicker or thinner and have an active length of between 1 and 5 mm or more or less and may be fabricated of tungsten, platinum or platinum-rhodium wire. The temperature sensitive resistance element 22 may be positioned or suspended according to conventional practice in a fluid flow, the velocity of which is to be determined. The temperature sensitive resistance element 22 is electrically connected to the positive input of a comparator 24 through a length of RG58 coaxial cable 26 or other, preferably shielded, one or two conductor cable.

In nearly all installations, the temperature sensitive resistance element 22 will be disposed at a finite distance from the remainder of the constant temperature anemometer assembly 20 which will typically be disposed within a housing or other protective structure 28. Because of the length of the coaxial cable 26 and an impedance mismatch between the temperature sensitive resistance element 22 and the coaxial cable 26, interference in the form of reflected transients will typically exist at the driven end of the coaxial cable 26. However, their effects can be minimized by appropriate transient suppression techniques which are based upon the propagation speed and reflection time of signals in the coaxial cable 26 as discussed below.

The other, negative input of the comparator 24 is fed by a fixed reference voltage, the magnitude of which will be discussed below in the section relating to the transfer function of the pulse width modulated constant temperature anemometer assembly 20. The output of the comparator 24 provides a high logic signal when the applied voltage to the temperature sensitive resistance element 22 and one input of the comparator 24 exceeds the reference voltage applied to the other input of the comparator 24.

The foregoing description relating to signals applied to the positive and negative inputs of the comparator 24 assumes that the temperature sensitive resistance element 22 has a positive temperature coefficient, that is, the resistance increases with increasing temperature. If the particular temperature sensitive resistance element 22 chosen exhibits a negative temperature coefficient of resistance, it is coupled to the negative input of the comparator 24 and the reference voltage is provided to the positive input of the comparator 24.

The output of the comparator 24 is then provided to a pulse suppression network or circuit 30. The pulse suppression circuit 30 will be described in greater detail subsequently. For the moment, however, it should be understood that the pulse suppression circuit 30 includes an AND gate 32 having a pair of inputs, one of which is driven by the two state logic output of the comparator 24. For purposes of the present discussion, and in an installation or application where reflected pulses from the temperature sensitive resistance element 22 and the coaxial cable 26 are not present, either because the impedance of the temperature sensitive resistance element 22 and the coaxial cable 26 match or because the separation between the resistance element 22 and the drive circuitry is so small and the length of coaxial cable 26, if any, is so short that reflections are minimal, the pulse suppression circuit 30 and the AND gate 32 may be omitted and the output of the comparator 24 may be provided directly to the reset input of a first RS flip-flop 40. Stated somewhat differently, operation of the pulse width modulated constant temperature anemometer assembly 20 does not inherently require the pulse suppression circuit 30. However, in numerous applications, a length of coaxial cable 26 will be utilized and such utilization will create reflected transients which must be suppressed or ignored or they will interfere with operation of data generation of the pulse width modulated constant temperature anemometer assembly 20.

The set input of the first RS flip-flop 40 is driven by a 100 KHz square wave or pulse train provided by a digital clock or time base assembly 50. The digital time base assembly 50 includes an accurate, i.e., preferably crystal controlled, 204.8 MHz oscillator 52 which provides a first square wave output directly to a divide by eight (8) network 54. The divide by eight (8) network 54 provides an accurate 25.6 KHz square wave output directly to a divide by two hundred fifty-six (256) network 56. The output of the divide by two hundred fifty-six (256) network 56, namely, a 100 KHz square wave is provided to count detectors in the pulse suppression circuit 30 which will be described below. As noted above, the 100 KHz square wave signal is also provided to the set input of the first RS flip-flop 40.

The first RS flip-flop 40 functions as the pulse width modulation control. The first RS flip-flop 40 provides an output signal of variable duration at its Q output which is initiated at the beginning of each square wave pulse applied to the set input by the divide by two hundred fifty-six (256) network 56. It should be appreciated that both the frequencies of the oscillator 52 and the divided down frequency may be significantly higher or lower as desired. Particularly with regard to the 100KHz square wave signal, it may be increased to 2 MHz and beyond to improve data acquisition or reduced to 25 KHz or lower, for example, to match the slower time dependent heating characteristics of a relatively thick wire or film temperature sensitive resistance element 22.

The output of the first RS flip-flop 40 is provided to a buffer amplifier 42 which increases the voltage swing and current of the logic signal provided by the first RS flip-flop 40. For example, whereas the logic signal provided by the first RS flip-flop 40 may be that of a standard 5 volt logic system, the output of the buffer amplifier 42 may be slightly higher, for example, up to 10 volts for a typical application or higher to match the electrical characteristics of the temperature sensitive resistance element 22. Likewise, the current may be significantly higher in order to provide sufficient electrical energy to the temperature sensitive resistance element 22 to cause heating thereof. Preferably, a ferrite bead inductor 44 or similar transient suppression device is placed in the output line from the buffer amplifier 42 to suppress unwanted transients. The signal is then provided to a voltage divider network 46 comprising an impedance matching fixed resistor 48 having a typical resistance of 50 ohms and the temperature sensitive resistance element 22. The output of the buffer amplifier 42 is thus a train of pulses having variable widths, i.e., a pulse width modulated signal. Depending upon the downstream data storage or recovery device utilized with the pulse width modulated constant temperature anemometer assembly 20, this pulse width modulated signal at the output of buffer amplifier 46 may be directly provided to such equipment and/or further conditioned or processed as necessary.

In spite of the utilization of the ferrite bead inductor 44 and the impedance matching achieved with the 50 ohm fixed resistor 48 at the driven end of the coaxial cable 26, reflections of the leading and trailing edges of the square wave drive pulses to the temperature sensitive resistance element 22 will appear at the input to the coaxial cable 26. These reflections will have the appearance of a severe overshoot at the rising edge of the square wave and a similar negative going overshoot at the trailing edge of the square wave. Unsuppressed, these reflections generate pulses which will cause anomalous operation and data inaccuracies if supplied to the reset input of the first RS flip-flop 40.

The minimum duration of these transient effects will be:

$$T_{cable} = 2 \frac{L}{V} \tag{Eq. 3}$$

where L is the length of the cable in meters and V is typically between 0.66 and 0.8 the speed of light, that is, approximately 200 to 240×10$^6$ M/Sec. This results in a $T_{cable}$ of 42 n Sec. to 50 n Sec. It will be appreciated that this equation may be utilized to compute the pulse reflection time for various lengths of coaxial cable 26 and thus the time during which the signal to the reset input of the first RS flip-flop 40 must be disabled or the signal thereto must be suppressed for some multiple of $T_{cable}$ since additional reflections with the same time scale as $T_{cable}$ may occur.

A 5 meter (16.4 feet) length of cable 26 separating the temperature sensitive resistance element 22 and the remainder of the components of the pulse width modulated constant temperature anemometer assembly 20 in the housing 28 is considered a nominal length of coaxial cable 26 which has been found sufficient in most laboratory and research applications and is the length of coaxial cable 26 for which the suppression techniques and values presented herein are optimized. It should be appreciated that longer or shorter lengths of coaxial cable 26 may be utilized and if they are, correspondingly distinct time based corrections will be necessary. The suppression techniques disclosed, however, are fully functional for different lengths of coaxial cable 26 and reflection times.

The transient suppression network or circuit 30 includes a first count detector 36 driven by a hexadecimal eight line output from the divide by 256 network 56. When a full count of 256 has been achieved the first count 36 detector provides a logic signal to the set input of the second RS flip-flop 34. The not Q ($\overline{Q}$) output of the second RS flip-flop 34 is thus absent and the AND gate 32 blocks the signal from the comparator 24, inhibiting reset of the first RS flip-flop 40. When a second count detector 38 which has been adjusted by external means, such as a DIP switch or similar device, to provide an appropriate delay period corresponding to the observed reflection time of the coaxial cable 26 has elapsed, the reset input of the second RS flip-flop 34 is pulsed, the output is switched to not Q ($\overline{Q}$) and a logic signal is provided to the AND gate 32. When the other input of the AND gate 32 goes high due to a high logic output from the comparator 24, the AND gate 32 conducts and provides a high logic signal to the reset input of the first RS flip-flop 40, the pulse width modulation control flip-flop.

The pulse width modulated constant temperature anemometer assembly 20 may also include control and output circuitry 60. The control and output circuitry 60 include a dual input AND gate 62 which receives the undivided 204.8 MHz square wave signal from the oscillator 52. The other input of the dual input AND gate 62 is driven by the pulse width modulated output of the first RS flip-flop 40. When both inputs are present, the AND gate 62 provides a logic high signal to a sixteen bit binary counter 64 which counts the number of pulses or logic highs provided to it. The output circuit 60 also includes totalizing control circuitry 66 which receives the 100 KHz square wave signal from the divide by two hundred fifty-six (256) network 56. The totalizing control circuitry 66 provides a reset pulse to the sixteen bit binary counter 64. The output of the sixteen bit binary counter is provided to a sixteen bit latch 68 through a sixteen line bus. The sixteen bit latch 68 is also provided with a clock pulse signal from the output of the first count detector 36 which is also the set signal to the second RS flip-flop 34. When the output of the first count detector 36 goes positive it indicates that a complete control cycle has been completed and the sixteen bit latch 68 is pulsed to clear it. The output of the sixteen bit latch 68 is provided through a sixteen line bus 72 as a parallel 16 bit number to a personal computer or other data storage and retrieval device 74.

Figure 3:
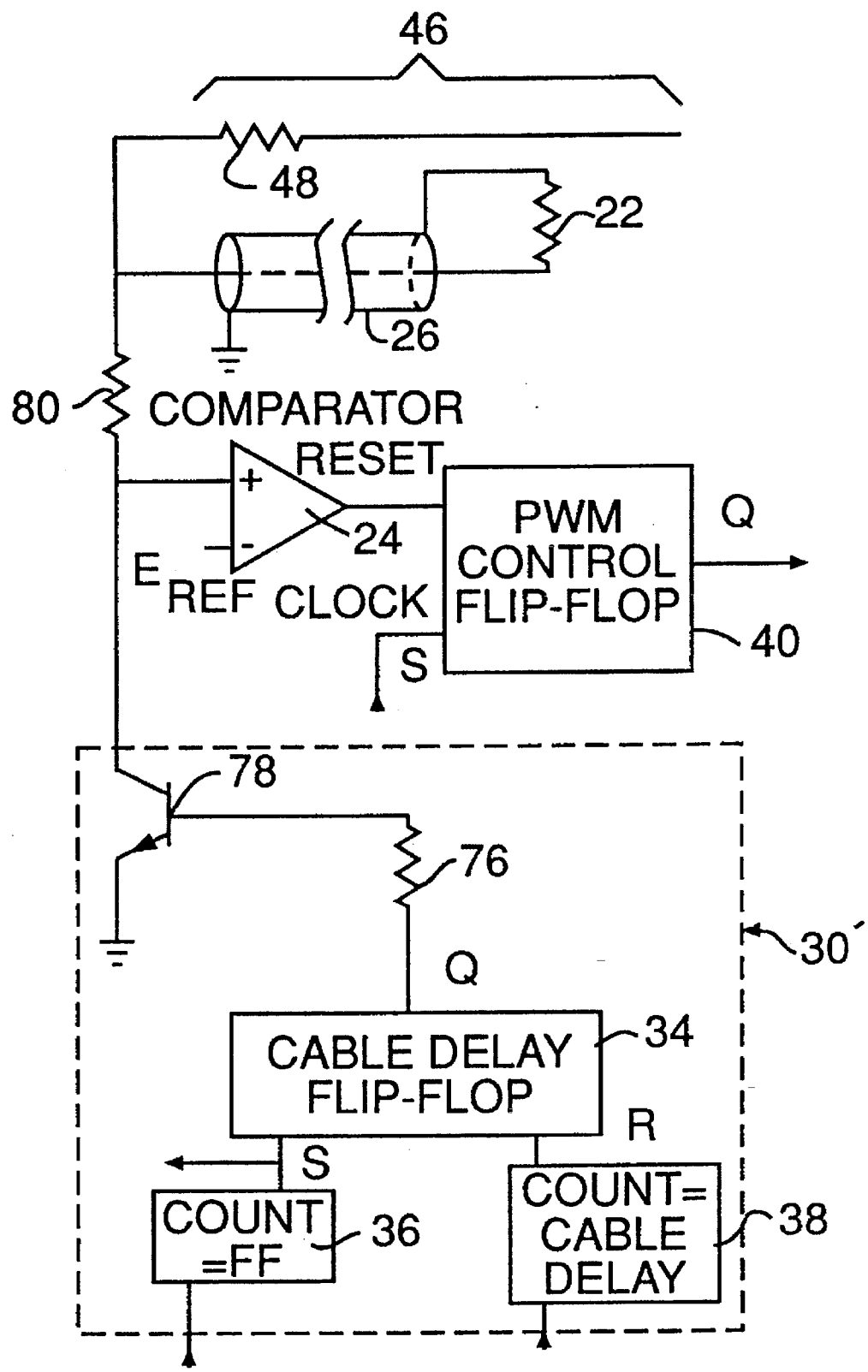
FIG. 3 is a first alternate embodiment of a reflected pulse suppression circuit of a pulse width modulated constant temperature anemometer according to the present invention.

Referring now to FIG. 3, a first alternate embodiment transient suppression circuit 30' is illustrated. The alternate embodiment transient suppression circuit 30' includes the second RS cable delay flip-flop 34, the first count detector 36 and the second, cable delay count detector 38. These two count detectors 36 and 38 provide set and reset logic signals to the second RS flip-flop 34, respectively, as they do in the preferred embodiment suppression circuit 30. With regard to the output of the second RS flip-flop 34, however, the positive logic output Q is utilized rather than the not Q ($\overline{Q}$) output. The Q logic output of the second RS flip-flop 34 is provided through a scaling and isolating resistor 76 to the base of an NPN transistor 78. The emitter of the transistor 78 is grounded and the collector is tied to the positive input of the comparator 24 which is driven by the output of the voltage divider network 46 illustrated in FIG. 2. A limiting resistor 80 disposed between the drive signal to the temperature sensitive resistance assembly 22 and the positive input of the comparator 24 limits current draw through the NPN transistor 78. When there is a high logic output from the second RS flip-flop 34, the NPN transistor 78 conducts, coupling the positive input of the comparator 24 to ground, thereby inhibiting operation of the comparator 24 and effectively inhibiting operation of the reset input of the first RS flip-flop 40. Thus, the alternate embodiment suppression circuit 30' achieves the same disabling of the reset input of the first RS flip-flop 40 through a different circuit configuration. It should be noted that the NPN transistor 78 may be replaced by a MOSFET or even an open collector gate.

Figure 4:
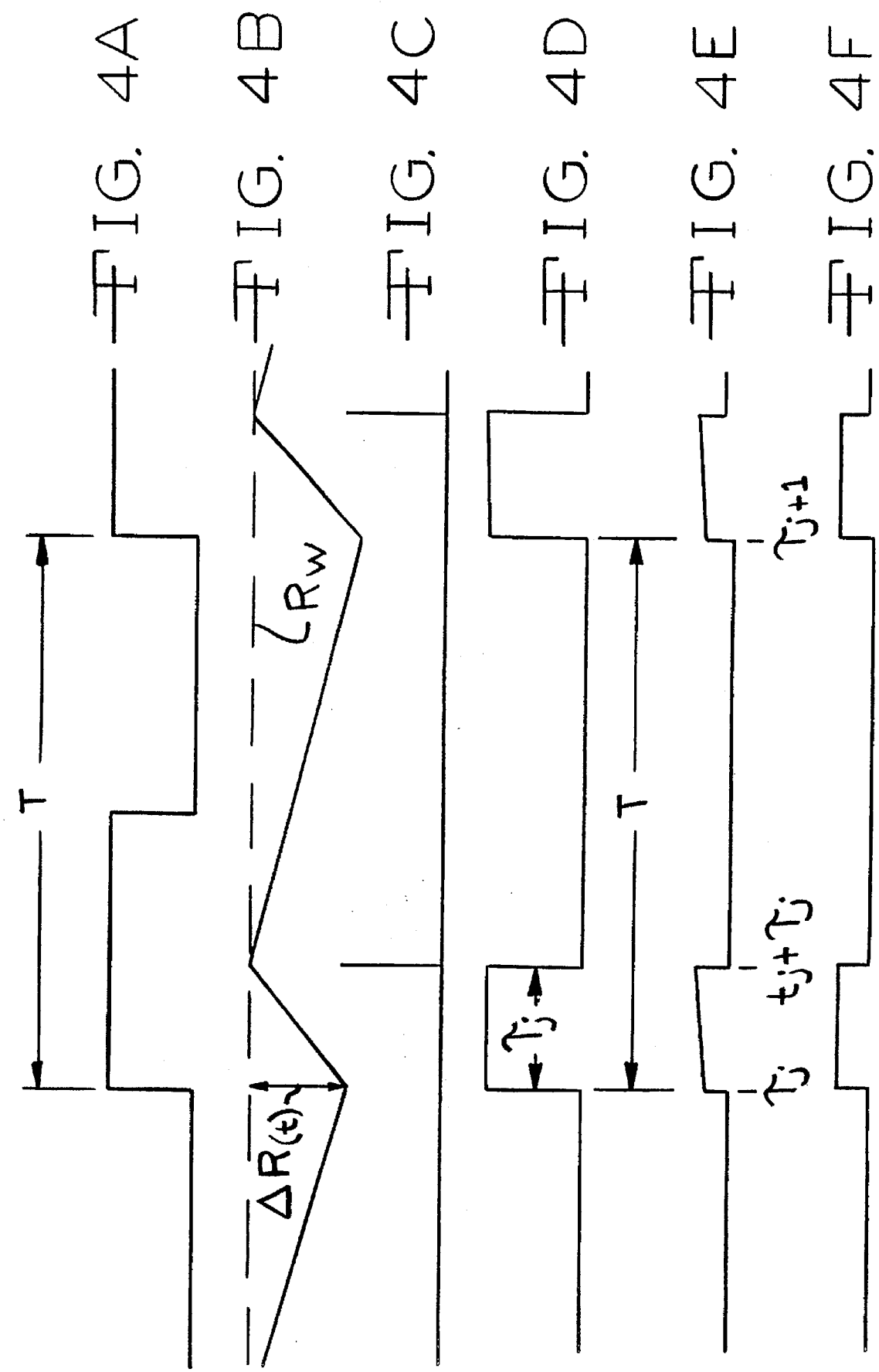
FIGS. 4A, 4B, 4C, 4D, 4E and 4F are timing diagrams presenting various voltage or current traces for a pulse width modulated constant temperature anemometer assembly according to the present invention which relates to the derivation of the transfer function.

Representative timing diagrams presenting the magnitude and activity of various signals within the pulse width modulated constant temperature anemometer assembly 20 includes a first trace or plot in FIG. 4A which presents the 100 KHz square wave provided at the output of the divided by two hundred fifty-six (256) network 56. It should be noted that the 100 KHz square wave utilized as the time base within the preferred embodiment is purely exemplary and illustrative and that this time base speed and cycle time may be adjusted over a very broad range as noted above.

Selection of the time base speed is affected by such factors as the size of the fine wire or thin film resistance element and thus its heating and cooling times as well as the length of the coaxial cable 26 and the signal propagation time therein. A further significant determinant of the frequency of the time base and thus the time T is the condition that $0 \leq \Delta R_W/R_W < 1$ and preferably that $\Delta R \approx 0.01 R_W$. This condition provides the dual constraint that the temperature sensitive resistance element 22 operates at nominally constant resistance and that the threshold for $R_p = R_W$ provides a distinctive time reference. The latter condition ensures that the resistance rise with $I^2R$ heating is sufficiently large that the $R_p \rightarrow R_W$ condition can be accurately registered. Using the Nyquist criteria of at least two samples per cycle, the maximum signal frequency to be resolved by the measurement is then ½T.

The trace or plot of FIG. 4B illustrates the time dependent change of resistance of the temperature sensitive resistance element 22 due to the voltage applied through the voltage divider 46. The horizontal dashed line represents the selected maximum operating temperature and thus resistance which is computed from the equation $R_W = R_A(1+OH)$ where $R_A$ is the resistance of the wire at ambient temperature and OH is selected to avoid oxidation or other deleterious effects. A typical value for OH for tungsten is between 0.7 and 0.8 and for platinum or platinum rhodium is between 1.0 and 1.1. The trace or plot of FIG. 4C represents the output of the comparator 24 which as noted, provides a pulse when the voltage applied to the temperature sensitive resistance element 22 and one input of the comparator 24 exceeds the reference voltage at its other input. The trace or plot of FIG. 4D illustrates the voltage at the output of the buffer amplifier 42 relative to the above plots or traces.

The trace of plot of FIG. 4E presents the time dependent voltage drop across the hot wire probe. The slope of the line has been exaggerated for clarity and thus clearly shows that as the temperature sensitive resistance element 22 heats during the period $\tau_j$, the resistance increases and thus the voltage thereacross also increases. The trace or plot of FIG. 4F presents the current flow through the temperature sensitive resistance element 22 during the same time intervals as presented in the above plots or traces. As stated above, the invention will also function with a negative temperature coefficient of resistance temperature sensitive resistance element 22.

The following is a description of the derivation of the transfer function for the pulse width modulated constant temperature anemometer 20 which utilizes nomenclature which appears in Table I, following such description. As noted above, the heat transfer characteristics from fine wires and thin films, can be generalized for constant temperature anemometer applications as $$E^2 = A + BQ^n \quad (Eq.4)$$

where E is the impressed voltage across the constant resistance wire, Q is the velocity that is responsible for the convective cooling of the wire, A and B are coefficients to be determined by calibration and n is nominally 0.45, a value determined by Collis and Williams discussed in their 1959 article Two-Dimensional Convection from Heated Wires at Low Reynolds Number appearing in the Journal of *Fluid Mechanics* Volume 6, pp. 357–384. The angular dependence factor ($\gamma$) is omitted for convenience in the present discussion. The use of a slant wire, to gain sensitivity to both the direction and magnitude of the velocity vector can be accounted for in the post-processing of the output of the pulse width modulated constant temperature anemometer assembly 20. Hereinafter, Q will be understood to be the velocity magnitude at the location of the fine wire or thin film temperature sensitive resistance element 22.

It is assumed in the foregoing Equation 2 that external control circuitry is available to maintain the resistance and thus the temperature of the temperature sensitive resistance element 22 at a constant value. This equation is derived from the balance of the dissipated power $$[P=(I_p^2 R_p)=(E_p^2/R_p)] \quad \text{(Eq. 5)}$$

and the free (~A) and forced (~$BQ^n$) convection:

$$P = \frac{E^2}{R_p} = \frac{A}{R_p} + \frac{B}{R_p} Q^n \quad \text{(Eq. 6)}$$

where P is the power dissipated in the probe. In principle, the condition of $R_p$=constant is adequately satisfied by a prior art constant temperature anemometer 10 such as shown in FIG. 1 since, as noted above, the high gain amplifier requires only a small imbalance ($E_{II}$–$E_{IV}$) to cause the amplifier to regain a balanced condition.

Operation of the pulse width modulated constant temperature anemometer assembly 20 is based upon a time variable resistance in which $R_p$=$R_W$ only at t=$t_j$+$\tau_j$. However, if T is sufficiently small compared to the response time of the temperature sensitive resistance element 22, then $$\Delta R/R_W \ll 1 \quad \text{(Eq. 7)}$$

where $\Delta R$ represents the maximum deviation of the probe resistance in one cycle; namely, $$\Delta R = R_W - R_p(t_j) \quad \text{(Eq. 8)}$$

The momentary power dissipation during the heating portion of the pulse width modulated constant temperature anemometer cycle is:

$$P = \frac{E_B^2(t)}{R_p(t)}, \quad \text{(Eq. 9)}$$

and will be nominally proportional to its value at ($t_j$+$\tau_j$)

$$\frac{E_B^2(t_j+\tau_j)}{R_w} \sim \frac{E_B^2(t)}{R_p(t)}. \quad \text{(Eq. 10)}$$

This proportionality permits the power dissipation in one cycle:

$$\int P(j^{th} \text{ cycle}) dt = \int_{t_j}^{t_j+T} \left[\frac{E_B^2(t)}{R_p(t)}\right] dt \quad \text{(Eq. 11)}$$

to be represented as:

$$\int P(j^{th} \text{ cycle}) dt \sim \frac{E_b^2(t_j+\tau_j)}{R_w} \tau_j. \quad \text{(Eq. 12)}$$

The above Equation 12 represents the zero value for $E_B$ during the latter portion of the cycle: $t_j$+$\tau_j$≤t<$t_j$+T.)

Figure 5:
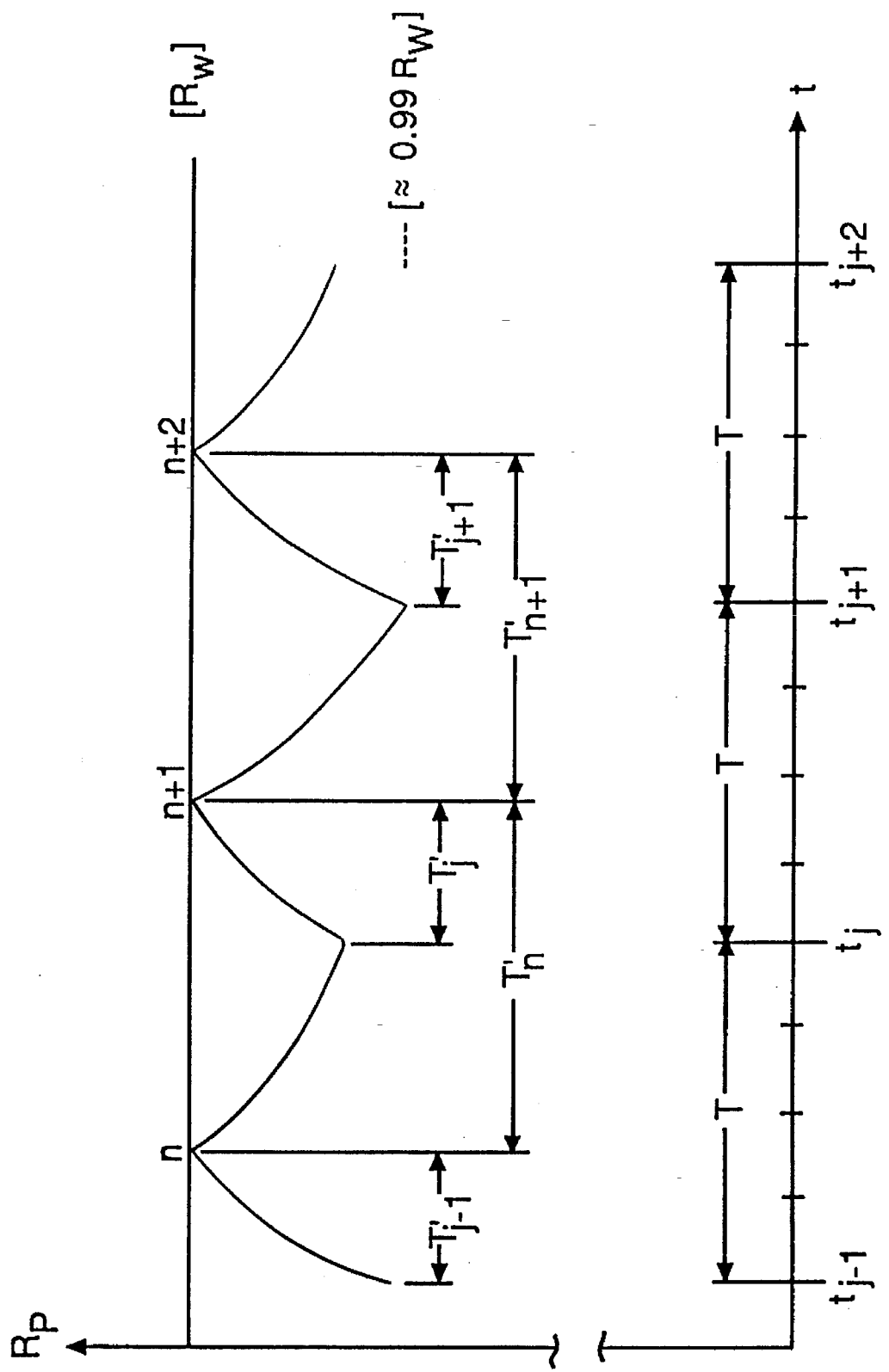
FIG. 5 is a diagram of several operating cycles of a pulse Width modulated constant temperature anemometer assembly according to the present invention.

FIG. 5 provides a schematic representation of the resistance of the temperature sensitive element 22 for the j–1, j, j+1 and j+2 cycles of operation.

FIG. 5 also identifies the times: n, n+1 and n+2 that define the irregular periods: T'$_n$. Specifically, n and T'$_n$ represent the events wherein $R_p$=$R_W$ and the times between these events, respectively. Their identification is of critical importance in the correct interpretation of the ability of the pulse width modulated constant temperature anemometer assembly 20 to faithfully represent the velocity (Q) as a function of time.

As noted, the instantaneous expression for the rate of energy loss from the wire is given by $$E^2 = A + BQ^n \quad \text{(Eq. 13)}$$

The heat transfer is, of course, a continuous function of time. However, the power dissipation is only present during the periods marked by $\tau$. Since the thermal state of the temperature sensitive resistance element 22 is returned to the same value for the times marked n, the net transfer of thermal energy and the net power dissipation are in balance for each (irregular) period marked T'.

As shown in Equation 12, the net power dissipation is known for the n→n+1 time period in terms of the $\tau_j$ value. The corresponding average velocity (Q') is defined as $$\int_{t_{j-1}+\tau_{j-1}}^{t_j+\tau_j} A + B[Q(t)]^n dt = \int_{t=n}^{t=n+1} [A+B[Q(t)]^n] dt = \quad \text{(Eq. 14)}$$

$$[A + BQ_n'^n] T_n'$$

and using the energy loss rate Equation 12.

$$= \left[\frac{E_b^2}{R_w} \tau_j\right] \quad \text{(Eq. 15)}$$

The pulse width modulated constant temperature anemometer assembly 20 can, therefore, provide an irregular time series (each T'$_n$) of the average cooling velocity (Q'$_n$) for the time segment (T'$_n$). A much more useful output is to organize the velocity data into a regular time series (each T) which represents the weighted sum of the velocities from the appropriate fractions of the adjacent (T'$_n$) periods. FIG. 5 presents the basis for this interpretation of the output of the pulse width modulated constant temperature anemometer assembly 20.

The average velocity Q'$_n$($t_j$) is ascribed to the period ($t_{j-1}$+$\tau_{j-1}$)≤t<$t_j$+$\tau_j$. Additionally, the average velocity Q'$_{n+1}$ ($t_{j+1}$) is ascribed to $t_j$+$\tau_j$≤t≤$t_{j-1}$+$\tau_{j+1}$. The weighted fractions of the velocities that combine to define the velocity for the $j^{th}$ period are then $$Q(t_j) = 1/T[\tau_j Q'_n + (T-\tau_j)Q'_{n+1}] \quad \text{(Eq. 16)}$$

The Q' values for Equation 16 are obtained from Equation 15 utilizing the computations:

$$T_n' = T + \tau_j - \tau_{j-1}, \quad \text{(Eq. 17)}$$

$$Q_n' = \left[ \frac{\frac{E_b^2}{R_w} \frac{\tau_j}{T_n'} - A}{B} \right]^{1/n}, \qquad \text{(Eq. 18)}$$

and $$Q_{n+1}' = \left[ \frac{\frac{E_b^2}{R_w} \frac{\tau_{j+1}}{T_{n+1}'} - A}{B} \right]^{1/n}. \qquad \text{(Eq. 19)}$$

As a practical matter, the output of the pulse width modulated constant temperature anemometer assembly 20 provides a regular, i.e., each T, time series of $\tau_j$ values and Equations 17, 18, 19 and 16 may then be evaluated through post-processing in order to recover $Q(t_j)$.

A time average value for the velocity is readily obtained from the pulse width modulated constant temperature anemometer assembly 20. This value may be the object of a flow field study or it may represent the desired data for the pre- or post- (data acquisition) calibration of the sensor. From Equation 9

$$\begin{aligned}
\lim_{T \to \infty} \frac{1}{T} \int_0^T P dt &= \lim_{T \to \infty} \frac{1}{T} \int \frac{E_B^2}{R_p} dt \qquad \text{(Eq. 20)} \\
&= \lim_{N \to \infty} \frac{1}{N} \sum_{j=1}^{N} \left[ \frac{E_B^2}{R_w} (t = t_j + \tau_j) \right] \tau_j \\
&= \frac{E_B^2}{R_w} (t = t_j + \tau_j) t_j \\
&= \lim_{T \to \infty} \frac{1}{T} \int_0^T (A + BQ^n) dt \\
&= A + BQ^n
\end{aligned}$$

Hence, the sum of the $\tau_j$ values over N cycles as N→∞ will permit $Q^n$ to be evaluated. In practice, the $\tau$ value will be obtained from a totalizing counter (for N cycles).

Since $E_b(t=\tau_j)$ and $R_W$ are constants, and since $$[E_B(t=t_j+\tau_j)]\bar{\tau}_j = \bar{E}_B \qquad \text{(Eq.21)}$$

the averaged equation with $E_A \sim E_B$ $$\bar{E}_A = A' + B' \bar{Q}^n \qquad \text{(Eq.22)}$$

Comparison of Equation 22 with Equation 2 provides an interesting contrast between the pulse width modulated constant temperature anemometer assembly 20 and a conventional constant temperature anemometer. The first power relationship of $E_A$ in Equation 22 indicates that the pulse width modulated constant temperature anemometer assembly 20 will be more sensitive for average velocity measurements than a conventional constant temperature anemometer.

Figure 6:
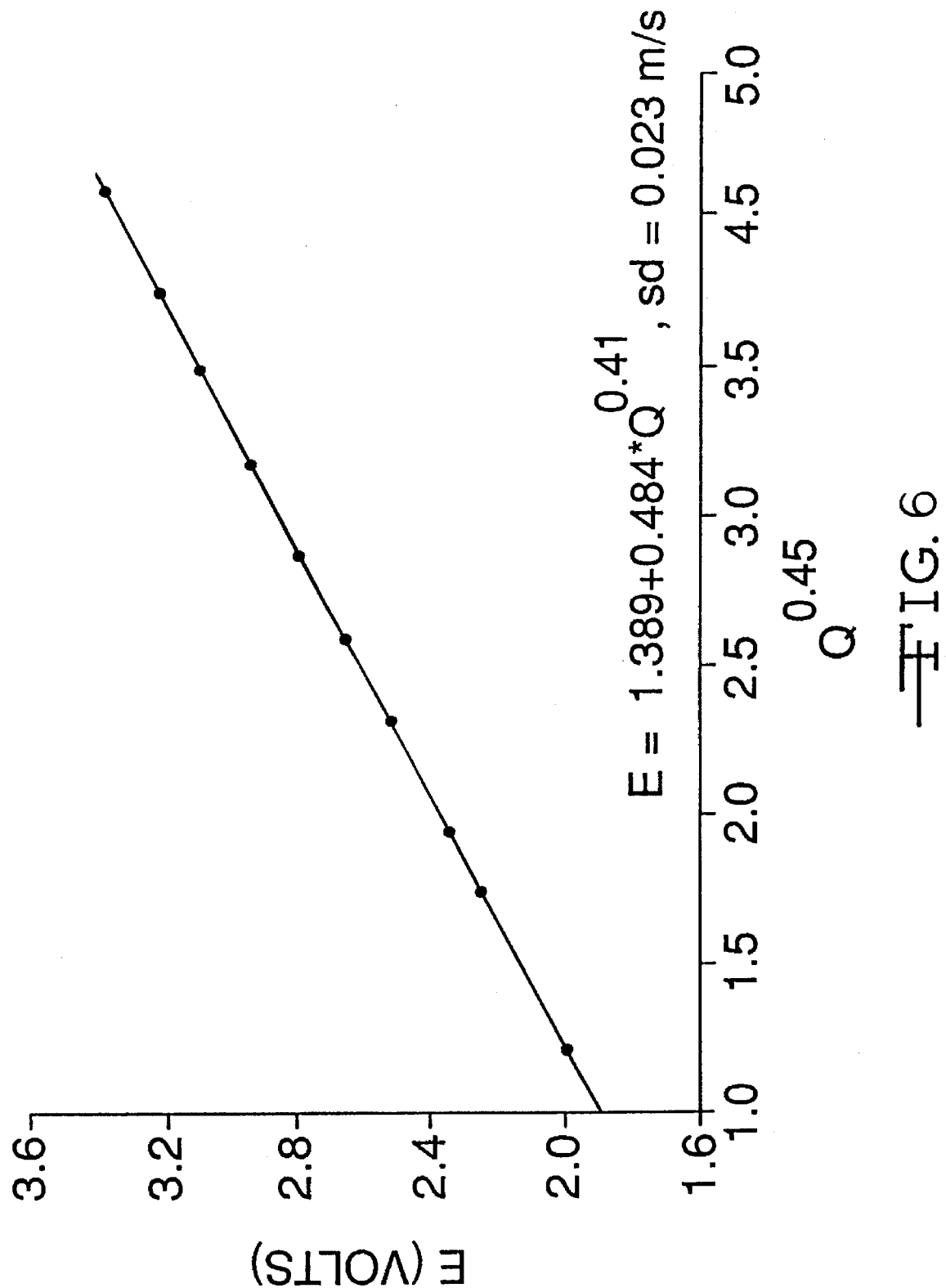
FIG. 6 is a calibration plot of a five micron diameter wire driven by the pulse width modulated constant temperature anemometer assembly according to the present invention presenting voltage versus $Q^n$ where n=0.41.

FIG. 6 illustrates another important attribute of Equation 22. The transfer function equation may be used in the calibration of a fine wire or thin film temperature sensitive resistance element driven by the pulse width modulated constant temperature anemometer assembly 20. With the constants A and B removed, the $E_a \sim Q^n$ relationship derived above as the transfer function for the pulse width modulated constant temperature anemometer 20 is well supported by the experimental data presented in FIG. 6. The indicated standard deviation of 0.023 M/Sec is based upon (a) the deviation of the inferred flow speed from the pressure transducer (MKS Baratron, 1 Torr) and from (b) that inferred from the best fit straight line $(E_A \sim Q^n)$.

TABLE I

| | Nomenclature |
|---|---|
| A, B, n | Coefficients for the heat transfer from the fine wire or thin film. See Equation 1. |
| $E_{B(t)}$ | Time dependent voltage drop across the temperature sensitive resistance element 22. |
| $E_B$ | Voltage drop across the temperature sensitive resistance element 22 at the instant $t = t_j + \tau_j$. See FIG. 4A through 4F. |
| $E_{REF}$ | Reference voltage established as a function of the cold resistance ($R_a$) of the temperature sensitive resistance element 22, the desired overheat (OH), and the circuit configuration. |
| $f_c$ | Frequency of the system control frequency ($f_c = 1/T$). |
| $I_p(t)$ | Current flow through the temperature sensitive resistance element 22 as a result of applying $E_A(t)$ across $R_1$ and $R_p(t)$. |
| N | Number of cycles to be averaged. See Equations 20 and 21. |
| OH | Overheat OH = $[R_w/R_a) - 1]$ |
| Q | Velocity magnitude |
| $R_a$ | Resistance of the temperature sensitive resistance element 22 at ambient temperature |
| $R_c$ | DC resistance of the coaxial cable 26. |
| $R_p(t)$ | Time-dependent resistance of the temperature sensitive resistance element 22. |
| $R_w$ | Operating resistance of the temperature sensitive resistance element 22. |
| $\Delta R$ | $R_w - R_p$ ($t = t_j$) |
| t | Time variable |
| $t_j$ | Beginning time of the $j^{th}$ operating cycle of the pulse width modulated constant temperature anemometer 20. |
| T | Period defined by the system clock. |
| $T_j'$ | Period between equal energy states: $t_{j-1} + \tau_{j-1} \to t_j + \tau_j$. See FIG. 3. |
| $\tau_j$ | Duration of heating portion of the $j^{th}$ heating cycle. See FIG. 5. |

The foregoing disclosure is the best mode devised by the inventors for practicing this invention. It is apparent, however, that devices incorporating modifications and variations will be obvious to one skilled in the art of constant temperature fine wire and thin film anemometers. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A pulse width modulated constant temperature anemometer assembly comprising, in combination, a temperature sensitive resistance element, a comparator having a first input for receiving a reference voltage, a second input for receiving a voltage signal from said temperature sensitive resistance element and an output, a clock for providing a series of timing pulses, a RS flip-flop having a set input driven by said square wave signal and a reset input driven by said output of said comparator and an output, and a buffer amplifier driven by said output of said RS flip-flop and having an output provided to said temperature sensitive resistance element.

2. The anemometer assembly of claim 1 further including a counter and latch for accumulating operating data from said output of said RS flip-flop.

3. The fine wire anemometer of claim 1 wherein said temperature sensitive resistance element is a fine wire or thin film sensor.

4. The anemometer assembly of claim 1 wherein the transfer function of such assembly is $$\overline{E}_A = A + B\overline{Q}^n$$

where $\overline{E}_A$ is the time averaged voltage across said resistance element, A and B are constants, $\overline{Q}$ is the time averaged velocity responsible for convective cooling of said temperature sensitive resistance element and n is approximately 0.45.

5. The anemometer assembly of claim 1 wherein said buffer amplifier increases the current and voltage provided by said RS flip-flop.

6. The anemometer assembly of claim 1 further including a ferrite bead inductor disposed between said output of said buffer amplifier and said temperature sensitive resistance element.

7. The anemometer assembly of claim 1 further including a voltage divider comprising a resistor and said temperature sensitive resistance element.

8. The anemometer assembly of claim 7 wherein data relating to fluid velocity at said temperature sensitive resistance element is gathered at the input to said voltage divider.

9. The anemometer assembly of claim 1 further including a coaxial cable for interconnecting said temperature sensitive resistance element and said comparator and a suppression circuit for inhibiting operation of said RS flip-flop during a predetermined time corresponding to the duration of reflected pulses in said coaxial cable.

10. The anemometer assembly of claim 9 wherein said suppression circuit includes a second RS flip-flop having inputs driven by a pair of count detectors and an output for enabling and disabling said comparator output.

11. The anemometer assembly of claim 10 wherein said suppression circuit further includes an AND gate having two inputs and an output, a first of said inputs coupled to the output of said second RS flip-flop and the second of said inputs coupled to the output of said comparator and said output coupled to the reset input of said first RS flip-flop.

12. The anemometer assembly of claim 9 wherein said suppression circuit includes a second RS flip-flop having a pair of inputs and an output, a pair of count detectors driving said respective inputs of said second RS flip-flop and a solid state switch driven by said output of said second RS flip-flop for suppressing signals at said second input of said comparator.

13. A pulse width modulated constant temperature anemometer comprising, in combination, a temperature sensitive resistance element, a comparator having a first input for receiving a reference voltage, a second input for receiving a voltage signal from said temperature sensitive resistance element and an output, a clock for providing a square wave signal, a RS flip-flop having a set input driven by said square wave signal and a reset input driven by said output of said comparator and an output, a buffer amplifier driven by said output of said RS flip-flop and having an output provided to said temperature sensitive resistance element, and a counter and latch for accumulating operating cycle data derived from said output of said RS flip-flop.

14. The anemometer of claim 13 wherein said temperature sensitive resistance element is a fine wire or thin film sensor.

15. The anemometer of claim 13 wherein said buffer amplifier increases the current and voltage provided by said RS flip-flop.

16. The anemometer of claim 13 further including a coaxial cable for interconnecting said fine wire probe and said voltage divider and a suppression circuit for inhibiting operation of said RS flip-flop during a predetermined time corresponding to the reflection of pulses in said coaxial cable.

17. The anemometer of claim 16 wherein said suppression circuit includes a second RS flip-flop having inputs driven by a pair of counters and an output for enabling and disabling said comparator output.

18. The anemometer of claim 13 further including a suppression circuit for inhibiting operation of said RS flip-flop during a predetermined time.

19. A pulse width modulated anemometer assembly comprising, in combination, a temperature sensitive resistance element, a comparator having a first input for receiving a reference voltage, a second input for receiving a voltage impressed on said temperature sensitive resistance element and an output, a clock for providing a square wave signal, a RS flip-flop having a set input driven by said square wave signal and a reset input driven by said output of said comparator and an output, a buffer amplifier driven by said output of said RS flip-flop and having an output provided to said temperature sensitive resistance element, and a circuit for inhibiting operation of said RS flip-flop for a predetermined time after the beginning of a square wave pulse.

20. The anemometer assembly of claim 19 wherein said suppression circuit includes a second RS flip-flop having inputs driven by a pair of count detectors and an output for enabling and disabling said comparator output.

21. The anemometer assembly of claim 19 further including a counter and latch for accumulating operating cycle data derived from said output of said RS flip-flop.

22. The anemometer assembly of claim 19 wherein said suppression circuit includes a second RS flip-flop having a pair of inputs and an output, a pair of count detectors driving said respective inputs of said second RS flip-flop and a solid state switch driven by said output of said second RS flip-flop for suppressing signals at said second input of said comparator.

23. The anemometer assembly of claim 19 wherein the transfer function of such assembly is $$\overline{E}_A = A + B\overline{Q}^n$$

where $\overline{E}_A$ is the time averaged voltage across said resistance element, A and B are constants, $\overline{Q}$ is the time averaged velocity responsible for convective cooling of said temperature sensitive resistance element and n is approximately 0.45.

* * * * *